Patented June 9, 1931

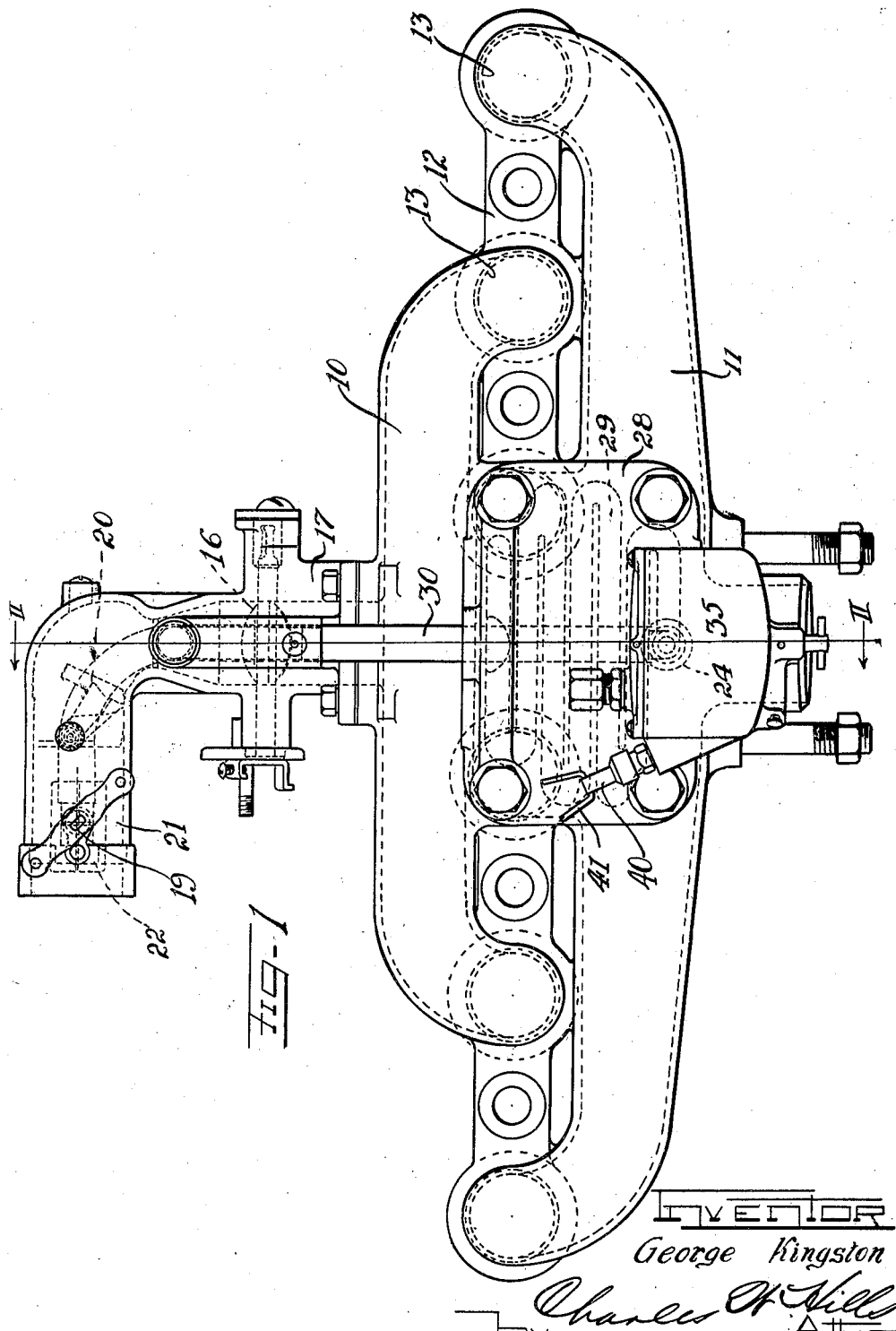

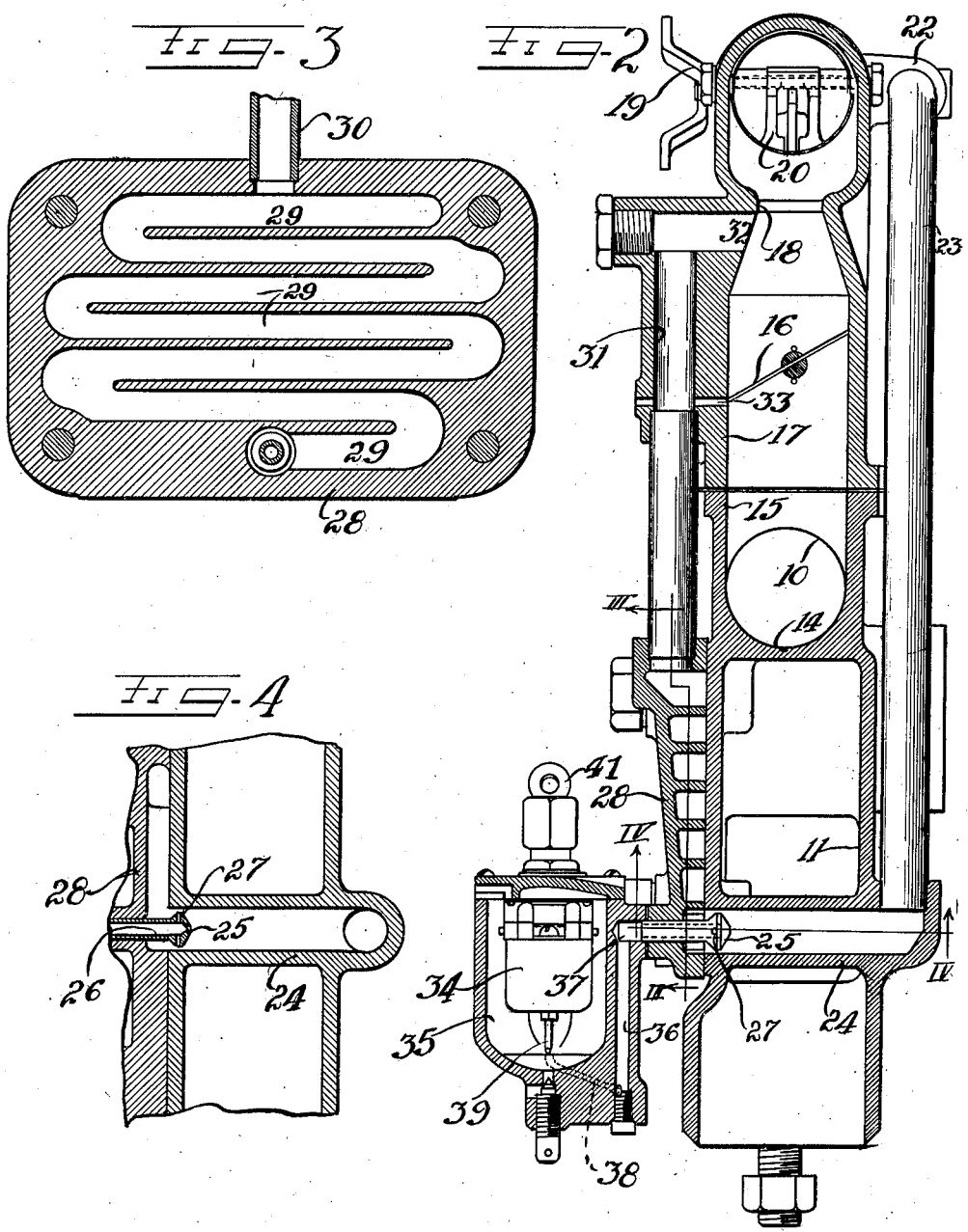

1,809,242

UNITED STATES PATENT OFFICE

GEORGE KINGSTON, OF KOKOMO, INDIANA, ASSIGNOR TO KINGSTON PRODUCTS CORPORATION, OF KOKOMO, INDIANA, A CORPORATION OF INDIANA

MANIFOLD

Application filed March 14, 1927. Serial No. 175,385.

This invention relates to a regenerator type intake manifold for internal combustion engines.

It is an object of this invention to provide an improved form of manifold and carbureter embodying a method of forming a very rich fuel and air mixture using only a portion of the total amount of air required and to superheat this mixture to produce a dry gas before mixing the same with the balance of the air supply. By so producing a very rich fuel and air mixture, using only a small portion of the air required for combustion, and superheating the mixture before mixing with the balance of the air, several important advantages are obtained. In the first place, lower grades of fuel can be used without trouble, because the superheated dry gas does not condense out fuel particles upon being mixed with the cooler main air supply. Also the volumetric efficiency of the engine is not seriously affected as would be the case if the entire air supply were to be heated to a point sufficient to insure vaporization of the fuel into a dry gas. Further, the very rich fuel and air mixture is ideal for priming and idling purposes when the main air supply is cut off either by the choke or throttle valve, this greatly simplifying the construction of the carbureter by eliminating separate provisions for priming and idling. The use of a dry gaseous fuel and air mixture also assures uniform distribution to the various cylinders, thus providing more even running because of the even power impulses.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a complete manifold embodying exhaust and intake passages and a carbureter.

Figure 2 is a section on the line II—II of Figure 1.

Figure 3 is a section on the line III—III of Figure 2.

Figure 4 is a section on the line IV—IV of Figure 2.

As shown on the drawings:

An intake manifold 10 is formed integral with an exhaust manifold 11, ties 12 connecting the adjacent intake and exhaust port connections 13 to provide means to bolt the combined manifolds to the cylinder block of the engine, which is not shown on the drawings. The intake manifold is positioned above the exhaust manifold and the two manifolds have a common wall 14 forming a hot spot facing the incoming fuel and air mixture which enters through the vertical inlet passage 15, a throttle valve 16 being mounted in an elbow fitting 17 having a venturi 18 below the elbow with a choke valve 19 and a weighted air valve 20 in the horizontal branch 21 of the elbow fitting 17.

The limited air supply intended to have the fuel mixed therewith is drawn from the horizontal branch of the elbow fitting at 22, a point outside of and therefore unaffected by the operation of the choke valve and is conducted through a pipe 23, between the manifolds and the cylinders of the engine to a passaged boss 24 cast integral with the exhaust manifold and crossing the same. Under normal operating conditions this boss 24 is maintained very hot, thus highly heating the air flowing therethrough. A fuel nozzle, comprising a double conical head 25 forming a reversed or annular venturi passage with a fuel passage 26 and outlet apertures 27 just beyond the most restricted part of the passage, is mounted axially of the passaged boss 24 and is supported by a casing 28 having an open side and bolted to the side of the exhaust manifold, this casing having a labyrinth passage 29 therein to greatly increase the heated surface over which the fuel and air mixture must pass, without changing the area and consequently the velocity thereof; as a change of velocity would deposit liquid fuel on the highly heated surface of the manifold and result in carbonization due to the distilling off of the liquid. The casing passage 29 finally leads to a pipe 30 which extends up to a cored passage 31 in the elbow fitting 17 and thence opens into the main air passage at 32 just below the throat of the venturi 18. A priming and idling passage 33 is provided leading from the passage 31 into the main air passage just beneath the edge of the throttle valve 16 when the valve is in closed position.

Fuel is supplied to the fuel nozzle passage 26 by means of a simple form of float 34 and float chamber 35 by means of the passages 36 and 37 which are fed from the float chamber through an outlet passage 38 controlled by a needle valve 39 the external end 40 of which is provided with means 41 for connection to a distance control.

In operation the device of this invention produces an overrich dry superheated gas which is proportioned to the necessary extra air by the variable suction, above the throttle which suction controls both the movement of the weighted air valve 20 and the production of the fuel mixture in the by pass passages and the casing 28. The overrich mixture is not explosive even should the exhaust manifold become red hot, as there is not enough air in proportion to the fuel to sustain rapid combustion, so that the mixture may be gasified by superheating without danger. Such superheating, if applied to the whole air supply, would greatly reduce the volumetric efficiency of the engine and result in a decrease in the power output, but by superheating only a portion of the air and then remixing this air with the cool main air supply the performance is greatly improved.

It will thus be seen that I have provided an improved form of manifold and carbureter that permits the use of lower grade fuels such as kerosene while improving the performance of the engine by providing a dry gaseous charge.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A vaporizing manifold for internal combustion engines comprising associated intake and exhaust manifolds, carbureting means for supplying an over rich mixture of fuel and air to a main air inlet containing a venturi and leading to the intake manifold, said carbureting means comprising a primary air passage leading through the exhaust manifold, a carburetor having a fuel nozzle opening into said passage through the exhaust manifold, a tortuous passage formed alongside said exhaust manifold and adapted to receive the carbureted air from said primary air passage, a duct leading from said tortuous passage, to the venturi in said main air inlet, and a weighted valve in said main air inlet.

2. A vaporizing manifold for internal combustion engines comprising associated intake and exhaust manifolds, carbureting means for supplying an over rich mixture of fuel and air to a main air inlet leading to the intake manifold, said carbureting means comprising a primary air passage leading through the exhaust manifold, a carbureter having a fuel nozzle opening into said passage through the exhaust manifold, a tortuous passage formed alongside said exhaust manifold and adapted to receive the carbureted air from said primary air passage, and a duct leading from said tortuous passage to said main air inlet.

3. A vaporizing intake manifold associated with the exhaust manifold of an internal combustion engine comprising a main air intake having a venturi therein and connected directly to said intake manifold, a valve controlling said main air inlet, a primary air inlet leading to a passage through the exhaust manifold, means for introducing fuel into said passage through the exhaust manifold, means for additionally heating the fuel and air mixture so formed, and means for introducing said mixture into the main air inlet adjacent the throat of the venturi so formed.

4. A vaporizing intake manifold associated with the exhaust manifold of an internal combustion engine comprising a main air intake connected directly to said intake manifold, a valve controlling said main air inlet, a primary air inlet leading to a passage through the exhaust manifold, means for introducing fuel into said passage through the exhaust manifold, means for additionally heating the fuel and air mixture so formed, and means for introducing said mixture into the main air inlet.

In testimony whereof I have hereunto subscribed my name at Fort Myers, Lee County, Florida.

GEORGE KINGSTON.